(12) United States Patent
Edwards et al.

(10) Patent No.: US 7,733,539 B2
(45) Date of Patent: Jun. 8, 2010

(54) SCANNING METHOD FOR STITCHING IMAGES

(75) Inventors: Mark J. Edwards, Lexington, KY (US); Robert A. Pemberton, Lexington, KY (US); Robert W. Rumford, Lexington, KY (US); Gregory P. Washnock, Lexington, KY (US); Michael R. Wedding, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1484 days.

(21) Appl. No.: 11/082,082

(22) Filed: Mar. 16, 2005

(65) Prior Publication Data

US 2006/0209366 A1    Sep. 21, 2006

(51) Int. Cl.
    *H04N 1/04* (2006.01)
(52) U.S. Cl. .................. 358/474; 358/498; 358/497; 358/449; 358/450; 358/496; 382/284; 382/286; 355/29; 355/40; 355/46; 399/367; 399/364; 396/612
(58) Field of Classification Search ............ 358/474, 358/450, 449, 486, 498, 497, 496, 453, 462, 358/1.2, 538, 524, 523; 382/284, 286, 289, 382/178, 282, 318, 294; 355/29, 40, 46; 399/612, 364, 367, 371, 374; 271/227, 265.01, 271/275, 3.14; 396/612
    See application file for complete search history.

(56) References Cited

U.S. PATENT DOCUMENTS

| | | | | |
|---|---|---|---|---|
| 4,149,091 A | * | 4/1979 | Crean et al. ................. | 250/566 |
| 4,956,703 A | * | 9/1990 | Uzuda et al. ................. | 358/527 |
| 5,033,102 A | * | 7/1991 | Nakajima et al. ............ | 382/282 |
| 5,245,438 A | * | 9/1993 | Yamamoto et al. .......... | 358/296 |
| 5,715,070 A | * | 2/1998 | Tone et al. ................... | 358/468 |
| 5,839,033 A | * | 11/1998 | Takahashi et al. ........... | 399/187 |
| 5,841,549 A | * | 11/1998 | Munakata .................... | 358/296 |
| 5,959,744 A | * | 9/1999 | Kohri et al. .................. | 358/450 |
| 6,130,965 A | * | 10/2000 | Kobayashi et al. .......... | 382/284 |
| 6,133,943 A | | 10/2000 | Needham | |
| 6,263,118 B1 | * | 7/2001 | Kanno et al. ................. | 382/289 |
| 6,301,018 B1 | * | 10/2001 | Maeda et al. ................ | 358/449 |
| 6,320,643 B1 | * | 11/2001 | Morita ......................... | 355/29 |
| 6,353,460 B1 | * | 3/2002 | Sokawa et al. ............... | 348/555 |

(Continued)

*Primary Examiner*—Negussie Worku

(57) ABSTRACT

A method for scanning a media sheet with a scanning apparatus includes feeding the media sheet through the first set of rollers into a scanning area, such that a first portion of the media sheet is available for scanning. A first partial media sheet image of the first portion is scanned. The media sheet is fed into the second set of rollers, then out of the first set of rollers, such that a second portion of the media sheet is available for scanning. A second partial media sheet image of the second portion of the media sheet is scanned. At least the first partial media sheet image is combined with the second partial media sheet image to generate a full image of the media sheet. In a further embodiment, the number of partial scans may be increased as necessary to provide a complete image of the scanned object, e.g., the media sheet. For example, one or more intermediate scans may be performed in accordance with the present invention in addition to the scans occurring at the ends of media sheet. In another embodiment, multiple image sheets may be sequentially scanned forming a plurality of first and second partial media sheet images that are stitched together to form a panoramic image.

23 Claims, 7 Drawing Sheets

U.S. PATENT DOCUMENTS

| | | |
|---|---|---|
| 6,409,167 B1 | 6/2002 | Bohn |
| 6,448,771 B1 * | 9/2002 | Harvey et al. ............... 324/307 |
| 6,467,895 B1 | 10/2002 | Burns et al. |
| 6,507,415 B1 * | 1/2003 | Toyoda et al. ............... 358/450 |
| 6,507,450 B1 * | 1/2003 | Elliott ..................... 360/77.08 |
| 6,542,263 B2 | 4/2003 | Emmenegger et al. |
| 6,591,021 B1 * | 7/2003 | Breiter et al. ............... 382/274 |
| 6,660,442 B2 * | 12/2003 | Sata et al. ................... 430/100 |
| 6,690,482 B1 * | 2/2004 | Toyoda et al. ................ 358/1.2 |
| 6,783,225 B2 | 8/2004 | Burns et al. |
| 6,863,118 B1 * | 3/2005 | Wang et al. ............ 165/104.26 |
| 6,894,813 B2 * | 5/2005 | Spencer et al. .............. 358/483 |
| 6,961,145 B2 * | 11/2005 | Smith ........................ 358/1.2 |
| 7,145,691 B2 * | 12/2006 | Kato .......................... 358/1.9 |
| 7,460,279 B2 * | 12/2008 | Iwasaki ..................... 358/450 |
| 2003/0038992 A1 * | 2/2003 | Emmenegger et al. ...... 358/498 |
| 2006/0256397 A1 * | 11/2006 | Cui ........................... 358/450 |

* cited by examiner

SCANNING METHOD FOR STITCHING IMAGES

BACKGROUND

1. Field of the Invention

The present invention relates generally to scanning methods, and more particularly to the scanning of small media sheets, such as photos into two or more overlapping portions which are subsequently stitched together.

2. Description of the Related Art

It is known to take multiple images and combine them to form a composite image. For example, composite pictures may be formed that represent unobstructed and wide views of an extensive area. In order to create the composite image, overlapping features of successive images are mapped and stitched. Thus, stitching is a process where two or more discrete images, that are part of a larger scene, are combined, such that the combination of several discrete images represents one part of the larger image.

One such known method for producing a composite image includes selecting a current image from a plurality of sequentially captured images, wherein the current image has an offset. A central portion is extracted from the current image. The central portion has a first dimension substantially smaller than a first dimension of the current image and a second dimension substantially the same as a second dimension of the current image. The central portion of said current image is transferred onto a storage medium that stores the composite image to a position corresponding to the offset. The offset of the current image is estimated by relating a reference offset, associated with a first reference image, to a relative offset between the current image and the first reference image. The first reference image is selected from the plurality of sequentially captured images.

SUMMARY OF THE INVENTION

The invention, in one exemplary embodiment, is directed to a method for scanning a media sheet with a scanning apparatus having a scanning area and a media transport system for conveying the media sheet in a media feed direction, the media transport system having a first set of rollers located upstream of the scanning area with respect to the media feed direction and a second set of rollers located downstream of the scanning area with respect to the media feed direction, the method including feeding the media sheet through the first set of rollers into the scanning area, such that a first portion of the media sheet is available for scanning; scanning a first partial media sheet image of the first portion of the media sheet, and storing the first partial media sheet image in memory; feeding the media sheet into the second set of rollers, then out of the first set of rollers, such that a second portion of the media sheet is available for scanning in the scanning area, wherein an extent of the second portion partially overlaps an extent of the first portion; scanning a second partial media sheet image of the second portion of the media sheet, and storing the second partial media sheet image in memory; and combining at least the first partial media sheet image with the second partial media sheet image to generate a full image of the media sheet.

The invention, in another exemplary embodiment, is directed to a method for copying a media sheet with a scanning apparatus having a scanning area and a media transport system for conveying the media sheet in a media feed direction, the media transport system having a first set of rollers located upstream of the scanning area with respect to the media feed direction and a second set of rollers located downstream of the scanning area with respect to the media feed direction, the method comprising feeding the media sheet through the first set of rollers into the scanning area, such that a first portion of the media sheet is available for scanning; scanning a first partial media sheet image of the first portion of the media sheet, and storing the first partial media sheet image in memory; feeding the media sheet into the second set of rollers, then out of the first set of rollers, such that a second portion of the media sheet is available for scanning in the scanning area, wherein an extent of the second portion partially overlaps an extent of the first portion; scanning a second partial media sheet image of the second portion of the media sheet, and storing the second partial media sheet image in memory; stitching at least the first partial media sheet image to the second partial media sheet image to generate a full image of the media sheet; and reproducing the full image as a printed output.

In a further embodiment, the number of partial scans may be increased as necessary to provide a complete image of the scanned object, e.g., the media sheet. For example, one or more intermediate scans may be performed in accordance with the present invention in addition to the scans occurring at the ends of media sheet. In another embodiment, multiple image sheets may be sequentially scanned forming a plurality of first and second partial media sheet images that are stitched together to form a panoramic image.

DETAILED DESCRIPTION

Figure 1:
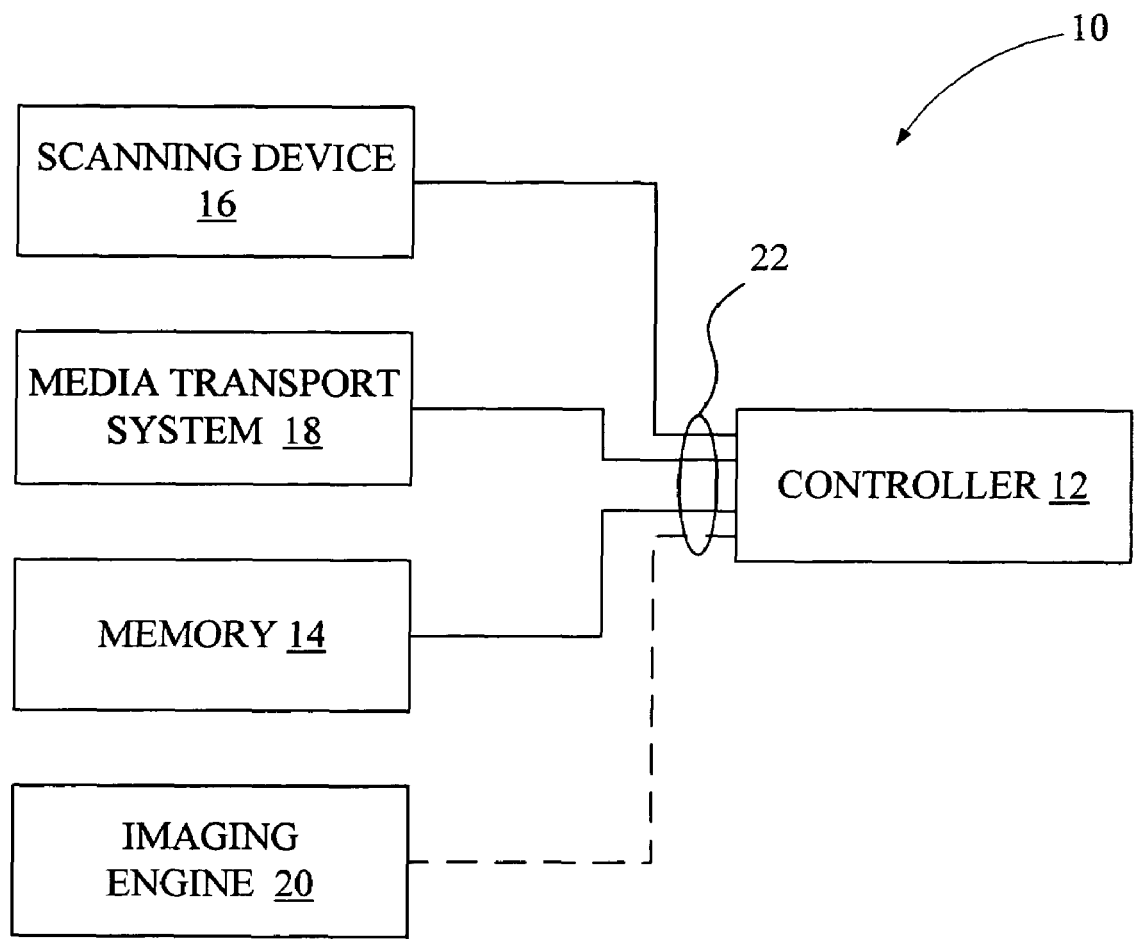
FIG. 1 is a block diagram of a scanning apparatus embodying the present invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and/or "mounted,"

and variations thereof herein are used broadly and encompass direct and indirect connections, couplings, and/or mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

Referring to FIG. 1, there is shown a block diagram of a scanning apparatus 10 embodying the present invention. Scanning apparatus 10 includes a controller 12, a memory 14, scanning device 16, a media transport system 18, and optionally (shown by dashed lines) an imaging engine 20. Controller 12 is communicatively coupled to each of memory 14, scanning device 16, media transport system 18, and imaging engine 20 via a communications link 22.

As used herein, the term "communications link" generally refers to structure that facilitates electronic communication between two components, and may operate using wired or wireless technology. Accordingly, communications link 22 may be, for example, one of, or a combination of, a bus structure, a direct electrical wired connection, a direct wireless connection (e.g., infrared or r.f.), or a network connection (wired or wireless), such as for example, an Ethernet local area network (LAN) or a wireless networking standard, such as IEEE 802.11.

Controller 12 may be, for example, an application specific integrated circuit (ASIC) having programmed and/or programmable processing capabilities. In some embodiments of scanning apparatus 10, such as for example where scanning apparatus 10 is an all-in-one (AIO) unit having printing and copying functionality in addition to scanning functionality, controller 12 may include in its memory a software or firmware program including program instructions that function as a driver for scanning device 16 and/or imaging engine 20. The driver program, for example, may include a scanner driver subroutine for controlling scanning device 16 and for interpreting image data received from scanning device 16. In addition, for example, the driver program may include a printer driver that places print data and print commands in a format that can be recognized by imaging engine 20.

Memory 14 may be, for example, semiconductor memory, such as for example, random access memory (RAM), read only memory (ROM), non-volatile RAM (NVRAM), and may be incorporated into controller 12, if desired. Further, memory 14 may be, for example, a mass data storage mechanism, such as a floppy disk drive, a hard disk drive, a CD-ROM drive and/or a DVD drive.

Scanning device 16 may operate using a stationary scan bar, or a moving scan bar, depending on the type of scanning desired or required for a particular scanning application. Some scanning apparatuses, for example, may utilize the same scanning bar to accommodate either a stationary scan bar implementation or a moving scan bar implementation. In implementations where a stationary scan bar is used, scanning occurs by feeding the media sheet with media transport system 18 past the stationary scanner. In implementations where a moving scan bar is used, for instance in a typical flat bed scanner, the media sheet may be transported to a stationary position on a document glass platen, and the media sheet may be scanned by scanning the scan bar across the stationary media sheet. Further, in the flat bed type scanner, scanning may occur in the media feed direction, or alternatively, in a direction transverse to the media feed direction. Additionally, although not common, the scan could occur at angles skewed (e.g. the scan bar may be angled slightly) with respect to the to the media feed direction.

Scanning device 16 may use, for example, either CCD (Charge Coupled Device) devices or CMOS (Complementary Metal Oxide Semiconductor) devices. It may be implemented, for example, either as a linear array or a matrix array. Further, for example, it may be implemented as either an image reduction system or a contact imaging system.

The CCD array is a collection of tiny, light-sensitive diodes, which convert photons into electrons. These diodes are called photosites—the brighter the light that hits a single photosite, the greater the electrical charge that will accumulate at that site. A media sheet, such as for example a photo or document, is scanned using a light source, such as a fluorescent bulb, and reflected light reaches the CCD array through a series of mirrors, filters and lenses. The exact configuration of these components will depend on the model of scanner. Many optical reduction scanners, for example, use a single pass method, wherein the lens splits the image into three smaller versions of the original. Each smaller version passes through a color filter (either red, green or blue) onto a discrete section of the CCD array. The scanner software combines the data from the three parts of the CCD array into a single full-color image. Alternatively, some optical reduction scan bars use a three pass scanning method, wherein each pass uses a different color filter (red, green or blue) between the lens and CCD array. After the three passes are completed, the scanner software assembles the three filtered images into a single full-color image.

The CIS arrays may be used, for example, in inexpensive flatbed scanners. CIS arrays replace the CCD array, mirrors, filters, lamp and lens with an array of red, green and blue light emitting diodes (LEDs) and a corresponding array of phototransistors. The image sensor array consisting of 600, 1200, 2400 or 4800 LEDs and phototransistors per inch (depending on resolution) spans the width of the scan area and is placed very close to the glass plate upon which rests the image to be scanned. Another version of the CIS uses a single set of red, green and blue LEDS in combination with light pipes to provide illumination of the material to be scanned. When the image is scanned, the LEDs combine to provide a white light source. The illuminated image is then captured by the row of sensors. CIS scanners are cheaper, lighter and thinner, but may not provide the same level of quality and resolution found in most CCD scanners. Color scanning is done by illuminating each color type of LED separately and then combining the three scans.

Media transport system 18 is used to transport the media sheet, such as a photo or other small document, to, through and from scanning device 16. One embodiment of media transport system 18 will be described in more detail below with respect to the diagrammatic representation of scanning apparatus 10 shown in FIG. 2.

Figure 2:
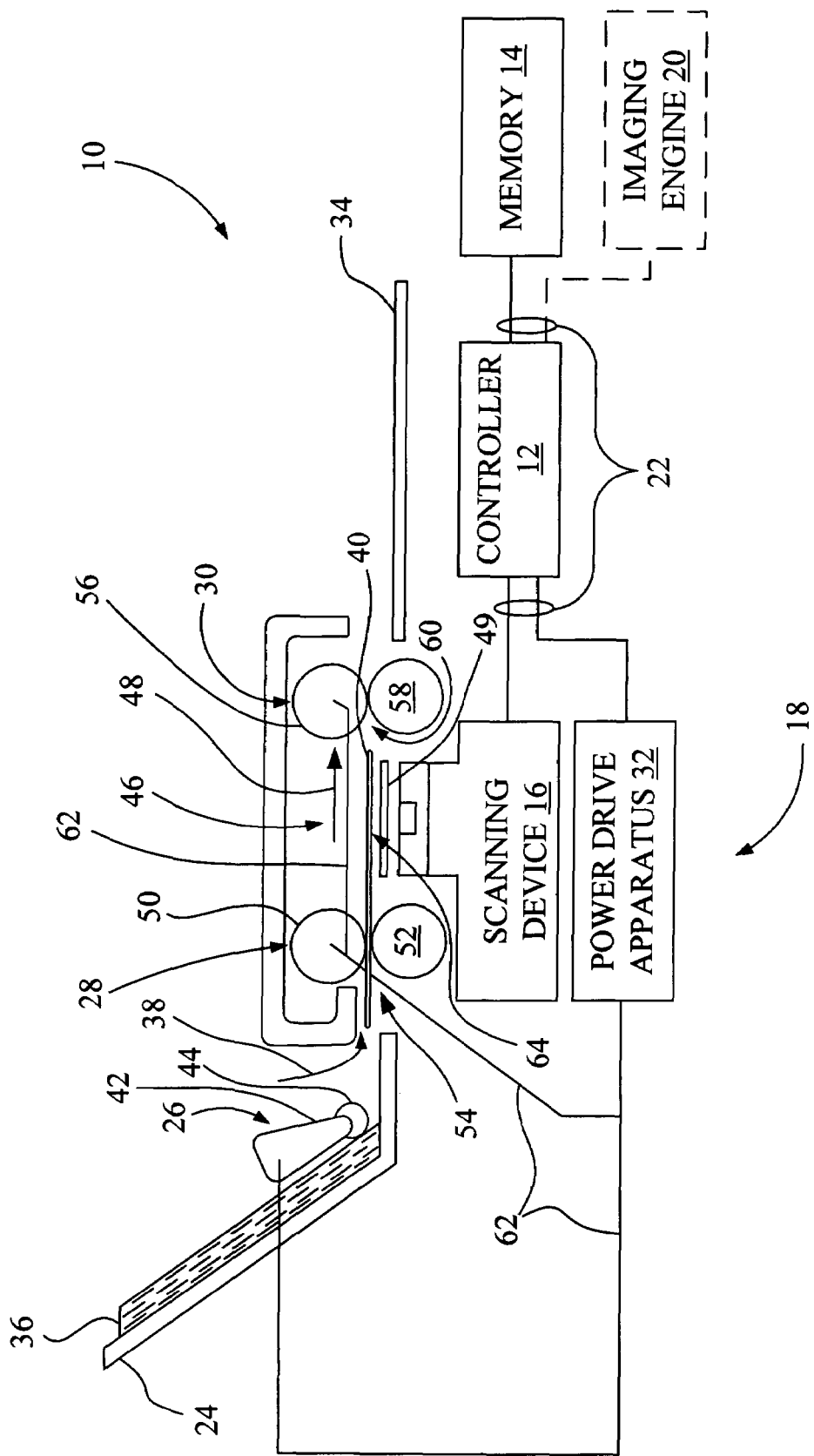
FIG. 2 is a diagrammatic representation of the scanning apparatus of FIG. 1, with a media sheet fed through a first set of rollers and into a scanning area, such that a first portion of the media sheet is available for scanning.

As shown in FIG. 2, media transport system 18 may include an input tray 24, a sheet picking device 26, a first set of rollers 28, a second set of rollers 30, a power drive apparatus 32, and an exit tray 34.

Figure 3:
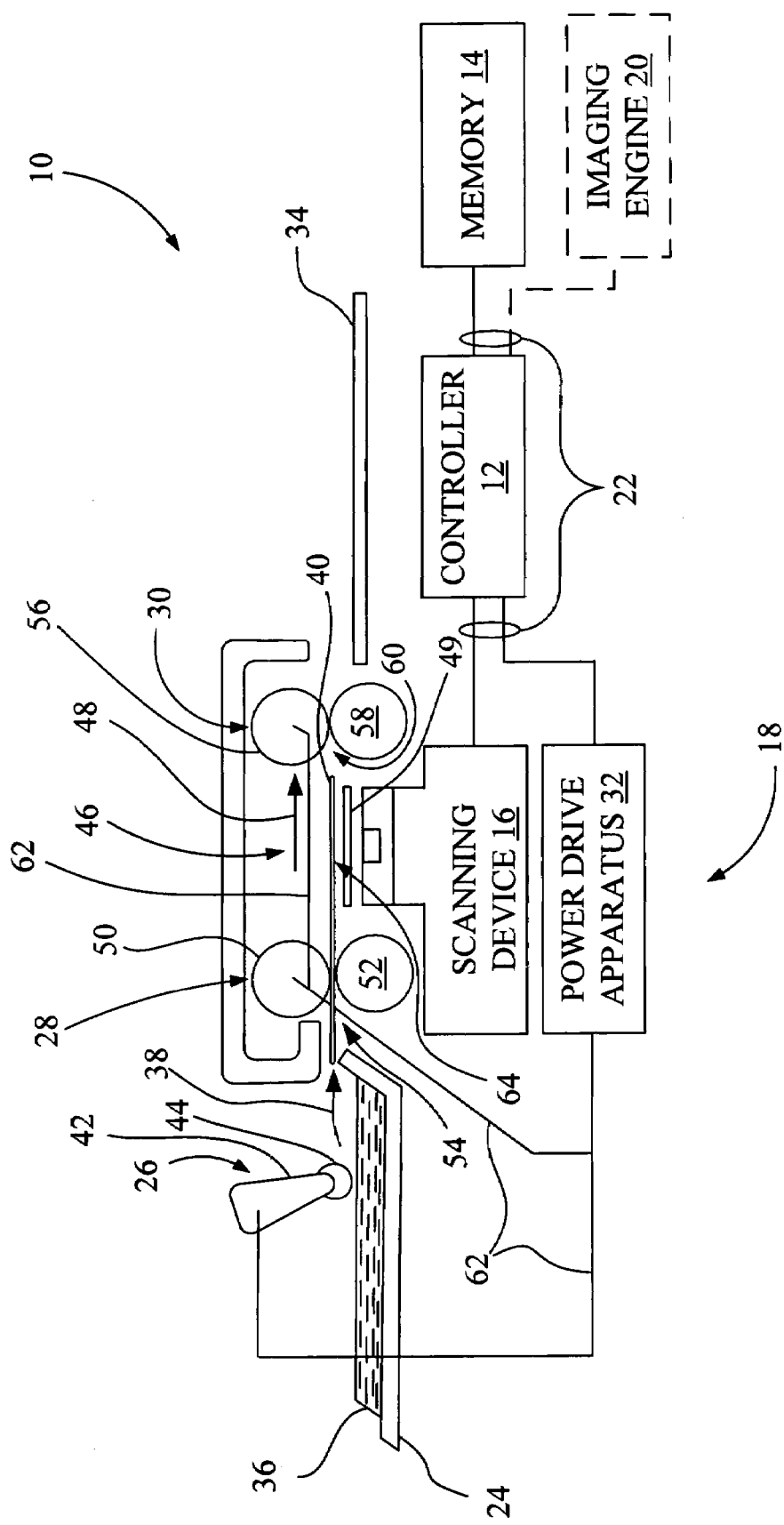
FIG. 3 is a diagrammatic representation of the scanning apparatus of FIG. 1, except having an alternative configuration for the input tray.

Input tray 24 is configured to hold a stack of media sheets 36, such as for example, photos, or other small documents or items, e.g., 4×6 inch postcards, or also may hold regular sized media sheets, e.g., A4, 8-½×11 inch, etc., or other more lengthy media, e.g., a roll of media. In the embodiment shown, input tray 24 combines with scanning device 16 to define a media path 38, which in this embodiment defines an L-shaped media path through scanning apparatus 10. Alternatively, as shown in FIG. 3, input tray 24 may be oriented substantially horizontally, such that media path 38 is defined as a substantially flat media path through scanning apparatus 10. As a further alternative (not shown), input tray 24 may be connected via a C-shaped paper path having additional rollers. Each of the L-shaped and flat media path configurations for media path 38 may be particularly advantageous for supplying small or stiff media sheets to scanning device 16, such as for example, photos or postcards.

Sheet picking device 26 is configured to automatically pick a media sheet 40 from the stack of media sheets 36 located in input tray 24, and is sometimes implemented in the art as an auto compensator pick device, which includes a pivoting arm 42, containing a plurality of gears, and a sheet pick roller 44 drivably connected to the plurality of gears of pivoting arm 42. Further, sheet pick roller 44 is positioned by pivoting arm 42 to contact the top media sheet in the stack of media sheets 36. The term "media sheet" is used herein to refer generally to any generally flat media, and may include for example, photos, postcards, CDs, DVDs, documents, etc.

The first set of rollers 28 are located upstream of a scanning area 46 with respect to a media feed direction 48. Scanning area 46 corresponds generally to a scan glass, i.e., a platen window, 49. The second set of rollers 30 are located downstream of scanning area 46 with respect to media feed direction 48. The first set of rollers 28 includes a plurality of drive rollers 50 and a corresponding plurality of backup rollers 52 defining a first nip 54. The second set of rollers 30 includes a plurality of drive rollers 56 and a corresponding plurality of backup rollers 58 defining a second nip 60.

Power drive apparatus 32 is drivably coupled via a transmission device 62, diagrammatically illustrated by interconnected lines, to each of sheet picking device 26, drive rollers 50, and drive rollers 56 to transport a media sheet, such as media sheet 40, from input tray 24 to, into, through, and out of, scanning area 46 of scanning apparatus 10 in a manner in accordance with the present invention. Power drive apparatus 32 may include as a power source a motor, such as a direct current (DC) motor or a stepper motor. Transmission device 62 may be, for example, a set gears and/or belts, and clutches configured to transmit a rotational force to the respective rollers at the appropriate time, in conjunction with commands supplied to power drive apparatus 32 from controller 12. Drive rollers 50, 56 may be drivably coupled together, for example, via a pulley/belt system or a gear train.

Referring again to FIG. 1, in embodiments including imaging engine 20, controller 12 supplies image data to imaging engine 20 for printing. Imaging engine 20 may be, for example, a print engine of any type known in the art for producing a printed output corresponding to image data that is supplied thereto. The term output as used herein encompasses output from any printing device such as color and black-and-white copiers, color and black-and-white printers, and all-in-one (AIO) devices that incorporate multiple functions, such as scanning, copying, and printing capabilities, in one device. Such printing devices may utilize ink jet, dot matrix, dye sublimation, electrophotographic (e.g., laser), and any other suitable print formats.

Figure 4:
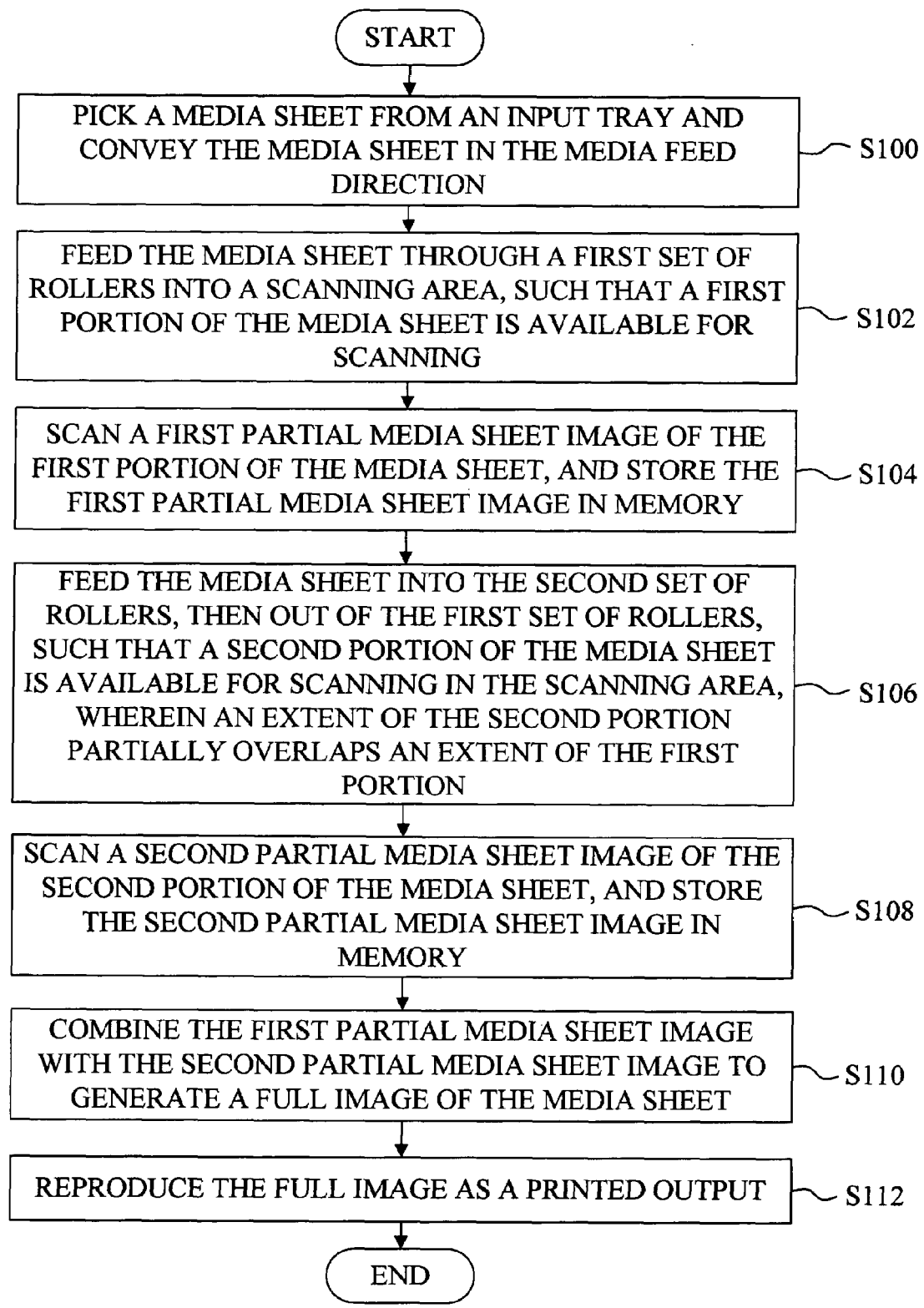
FIG. 4 is a flowchart illustrating a method for scanning a media sheet with a scanning apparatus, in accordance with the present invention.

FIG. 4 is a flowchart illustrating a method for scanning a media sheet with a scanning apparatus, such as scanning apparatus 10, in accordance with the present invention, and will be described below in conjunction with FIGS. 1, 2, 5A-5D and 6.

Figure 5A:
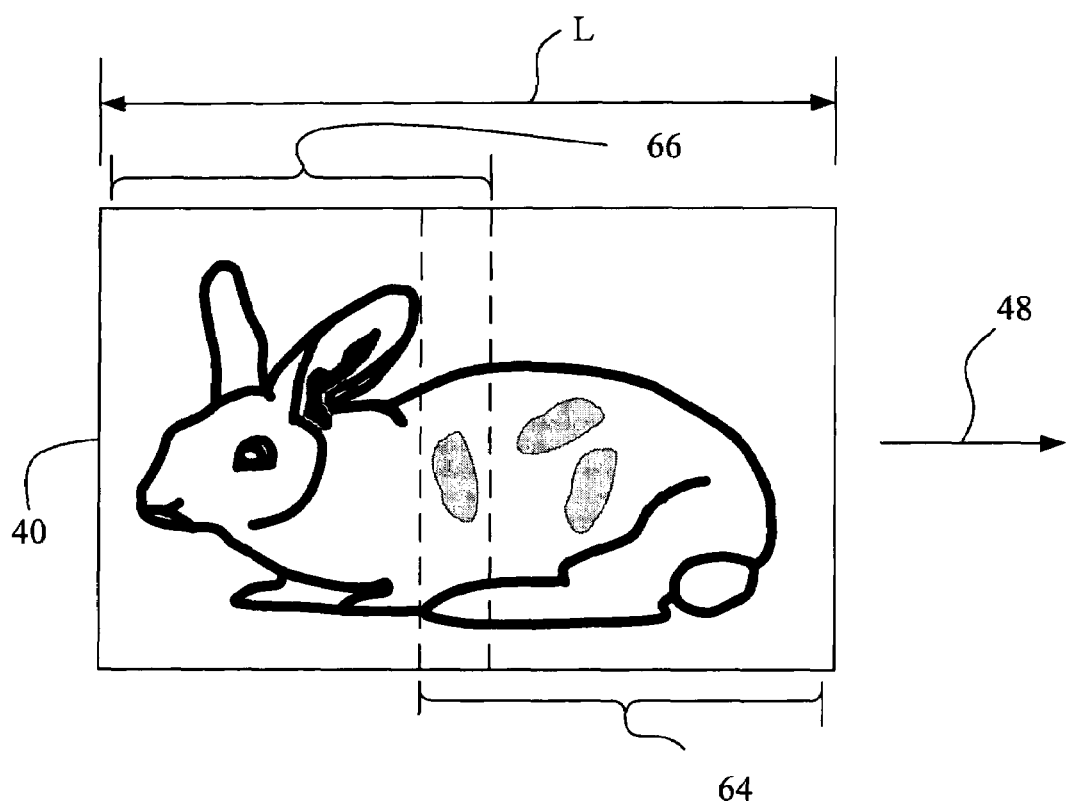
FIG. 5A is an exemplary media sheet image to be scanned in accordance with the present invention.

At step S100, at the command of controller 12, a media sheet, such as media sheet 40, is picked from input tray 24 by sheet picking device 26 to convey media sheet 40 in media feed direction 48 toward the first set of rollers 28. Once media sheet 40 is received in first nip 54, then sheet picking device 26 no longer drives media sheet 40. An exemplary image of media sheet 40 is shown in FIG. 5A.

At step S102, referring to FIG. 2, media sheet 40 is fed through the first set of rollers 28 and into scanning area 46 of scanning device 16, such that a first portion 64 (see also FIG. 5A) of media sheet 40 is available for scanning. In one embodiment, for example, first portion 64 is greater than 50 percent of a length L of media sheet 40, but less than a length required to reach the second nip 60 of the second set of rollers 30. As a more particular example, if media sheet 40 is a 4×6 inch photo, and media sheet 40 is oriented with its long dimension extending in media feed direction 48, i.e., the six inch dimension, then the length of first portion 64 will be greater than three inches.

Figure 5B:
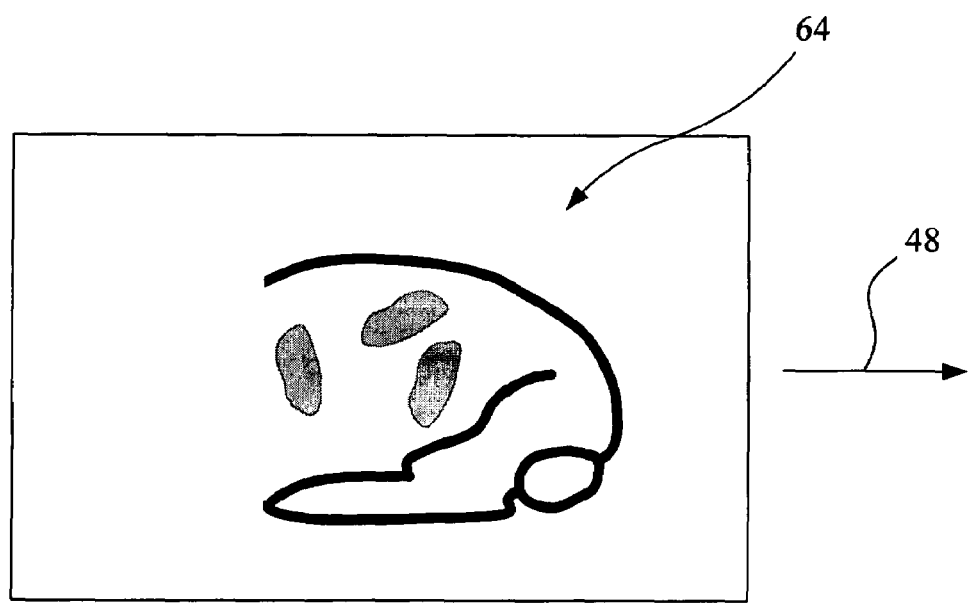
FIGS. 5B and 5C show two overlapping partial images relating to the media sheet image of FIG. 5A.

At step S104, a first partial media sheet image of first portion 64 of media sheet 40 is scanned, and the first partial media sheet image is stored in memory 14. In the context above, "the first partial media sheet image" refers to both the physical picture and/or text, symbols, etc. on first portion 64 of media sheet 40 and the electronic representation thereof generated by scanning device 16 and stored in memory 14. The scanning of first portion 64 of media sheet 40 is completed prior to media sheet 40 reaching the second nip 60 of the second set of rollers 30. An exemplary first partial media sheet image of first portion 64 of media sheet 40 is shown in FIG. 5B, wherein the scan direction is parallel to the media feed direction 48, in this example.

The scanning conducted by scanning device 16 may be effected by a stationary scan bar or a movable scan bar, and the scanning direction may be parallel to media feed direction 48, may be transverse to media feed direction 48, or may be askew or angled to media feed direction 48, depending on the type of scanner used.

Figure 6:
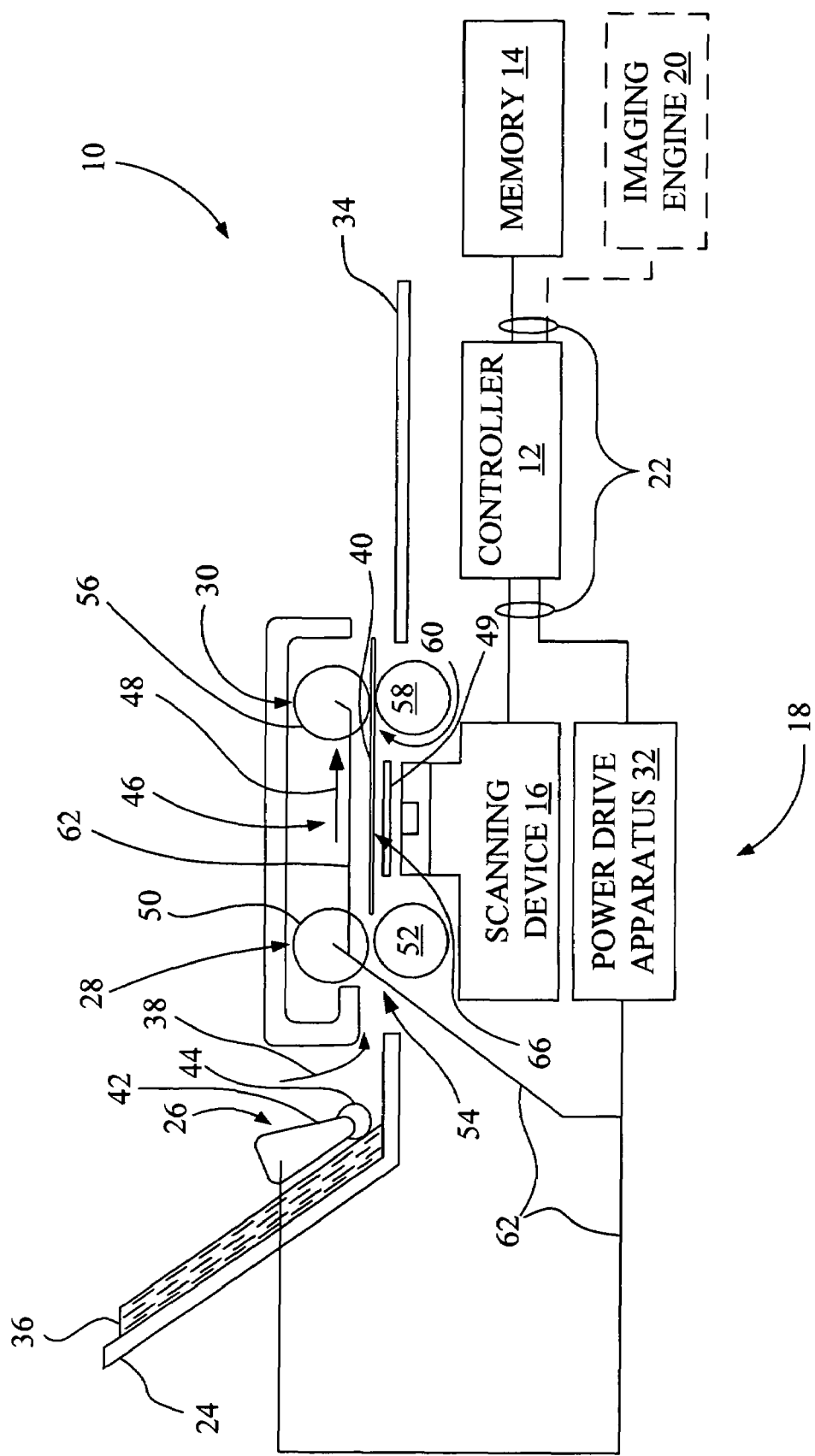
FIG. 6 is a diagrammatic representation of the scanning apparatus of FIG. 1, with the media sheet fed into the second nip formed by the second set of rollers, then out of the first set of rollers, such that a second portion of the media sheet is available for scanning in the scanning area.

At step S106, referring to FIG. 6, media sheet 40 is fed by the first set of rollers 28 in media feed direction 48 into the second nip 60 formed by the second set of rollers 30, then out of the first set of rollers 28, such that a second portion 66 of media sheet 40 is available for scanning in scanning area 46. As illustrated in FIG. 5A, an extent of the second portion 66 partially overlaps an extent of the first portion 64.

Figure 5C:
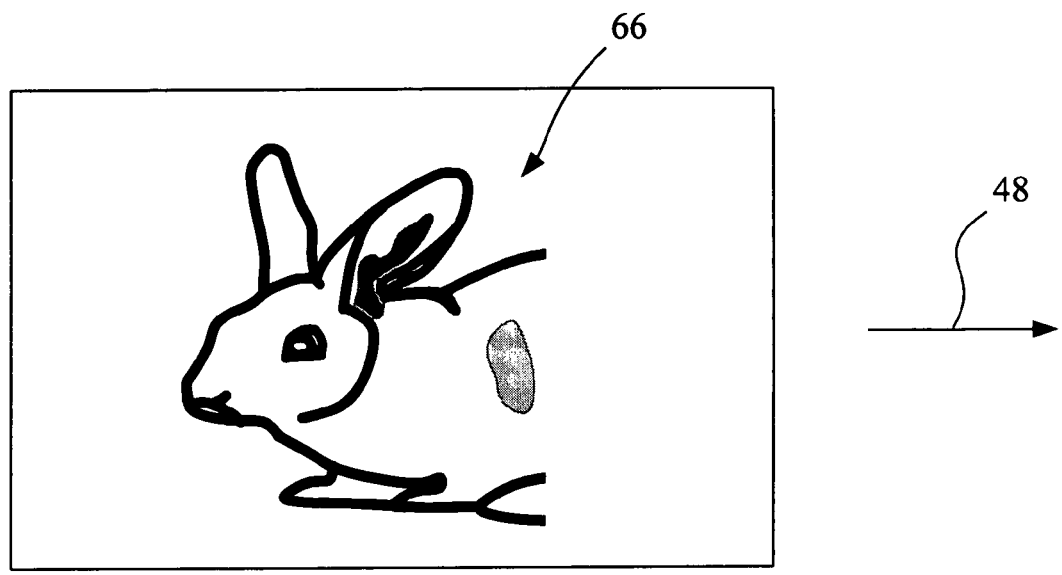

At step S108, a second partial media sheet image of second portion 66 of media sheet 40 is scanned, and the second partial media sheet image is stored in memory 14. In the context above, "the second partial media sheet image" refers to both the physical picture and/or text, symbols, etc. on second portion 66 of media sheet 40 and the electronic representation thereof generated by scanning device 16 and stored in memory 14. An exemplary second partial media sheet image of second portion 66 of media sheet 40 is shown in FIG. 5C. Media sheet 40 may then be conveyed to exit tray 34.

Figure 5D:
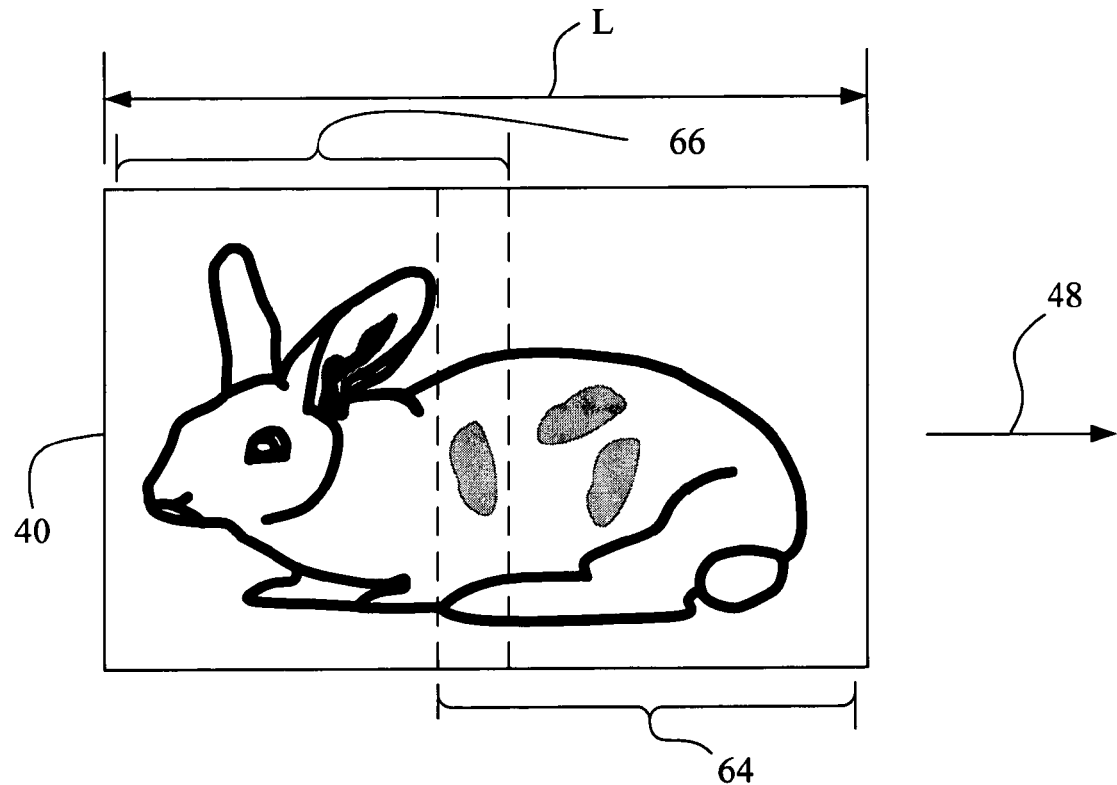
FIG. 5D shows a result of combining the images of FIGS. 5B and 5C.

At step S110, the first partial media sheet image is combined with the second partial media sheet image to generate a full image of media sheet 40. This combining may be performed, for example, by controller 12 retrieving the first partial media sheet image and the second partial media sheet image from memory 14, and then executing a combining algorithm. Such combining algorithms are commonly referred to in the art as "stitching algorithms", and are commercially available. One example of such a commercially available stitching algorithm is OmniStitcher™ available from Pixtra Corporation. An exemplary image of the combination, e.g., stitching, of the first partial media sheet image and the second partial media sheet image is shown in FIG. 5D.

If desired, the full image may include preliminary manipulation, for example, to correct for image abnormalities resulting from stitching to reduce stitching errors, or to crop or skew-correct the image, prior to storing or printing. The full image (in either manipulated or non-manipulated form) may be stored in memory 14 for archiving or further processing.

At step S112, which may be optional, the full image is sent to imaging engine 20 for printing to reproduce the full image as a printed output.

The number of partial scans may be increased as necessary to provide a complete image of the scanned object, e.g., media sheet 40. For example, one or more intermediate scans may be performed in accordance with the present invention in addition to the scans occurring at the ends of media sheet 40.

It is contemplated that the scanning device 16 may be implemented with a matrix image sensor such as is commonly used in a digital still camera. In this case the scanning steps of the method of this invention would be replaced with "snapshot" image capture steps, but the method would be otherwise remain unchanged.

It is also contemplated that this method may be extended such that multiple media sheets may be fed and scanned in to produce a single panoramic image. If the multiple media sheets containing overlapping portions of a larger panoramic image (for example, where a series of photographs are taken of a scenic vista as the camera is being panned across the scene) are processed in an iterative fashion in accordance with the method disclosed herein, a single panoramic image can be produced from the plurality of media sheets. The order of stitching the partial images stored in memory to form the panoramic image may be varied. For example, the stitching of the plurality of partial images may take place after all of the multiple media sheets have been scanned, the stitching may be started on the initial partial images stored in memory while the remainder of the images are being scanned and stored, or the partial images of each media sheet may be stitched together then stitched together with the other images from the other media sheets to form the desired panoramic image, or other combinations of the foregoing may be used. Further the partial images need not be stitched together in the correct spatial reference relative to the original scene or may be stitched with other images to form a collage. Other variations are left to the artisan.

The foregoing description of several methods and embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method for scanning a media sheet with a scanning apparatus having a scanning area and a media transport system for conveying said media sheet in a media feed direction, said media transport system having a first set of rollers located upstream of said scanning area with respect to said media feed direction and a second set of rollers located downstream of said scanning area with respect to said media feed direction, said method comprising:
   feeding said media sheet through said first set of rollers into said scanning area, such that a first portion of said media sheet is available for scanning;
   scanning a first partial media sheet image of said first portion of said media sheet, and storing said first partial media sheet image in memory;
   feeding said media sheet into said second set of rollers, then out of said first set of rollers, such that a second portion of said media sheet is available for scanning in said scanning area, wherein an extent of said second portion of the media sheet partially overlaps an extent of said first portion of the media sheet;
   scanning a second partial media sheet image of said second portion of said media sheet, and storing said second partial media sheet image in memory; and
   combining at least said first partial media sheet image with said second partial media sheet image to generate a full image of said media sheet.

2. The method of claim 1, wherein said first portion is greater than 50 percent of a length of said media sheet and said second portion is greater than 50 percent of said length of said media sheet.

3. The method of claim 1, wherein said combining includes stitching said first partial media sheet image with said second partial media sheet image to generate said full image of said media sheet.

4. The method of claim 3, said full image undergoing preliminary manipulation to correct for image abnormalities resulting from said stitching.

5. The method of claim 1, further comprising reproducing said full image as a printed output, said full image having a size that is substantially identical to a size of a corresponding media sheet image of said media sheet.

6. The method of claim 1, further comprising picking said media sheet from an input tray and conveying said media sheet in said media feed direction to said first set of rollers.

7. The method of claim 6, wherein said media feed direction is along a substantially flat feed path.

8. The method of claim 6, wherein said media feed direction is along an L-shaped feed path.

9. The method of claim 1, wherein said media sheet is a photo.

10. The method of claim 1, wherein a scan direction is parallel to said media feed direction.

11. The method of claim 1, wherein a scan direction is transverse to said media feed direction.

12. A method for copying a media sheet with a scanning apparatus having a scanning area and a media transport system for conveying said media sheet in a media feed direction, said media transport system having a first set of rollers located upstream of said scanning area with respect to said media feed direction and a second set of rollers located downstream of said scanning area with respect to said media feed direction, said method comprising:
   feeding said media sheet through said first set of rollers into said scanning area, such that a first portion of said media sheet is available for scanning;
   scanning a first partial media sheet image of said first portion of said media sheet, and storing said first partial media sheet image in memory;
   feeding said media sheet into said second set of rollers, then out of said first set of rollers, such that a second portion of said media sheet is available for scanning in said scanning area, wherein an extent of said second portion of the media sheet partially overlaps an extent of said first portion of the media sheet;

scanning a second partial media sheet image of said second portion of said media sheet, and storing said second partial media sheet image in memory;

stitching at least said first partial media sheet image to said second partial media sheet image to generate a full image of said media sheet; and reproducing said full image as a printed output.

13. The method of claim 12, wherein said first portion is greater than 50 percent of a length of said media sheet and said second portion is greater than 50 percent of said length of said media sheet.

14. The method of claim 12, further comprising correcting said full image for image abnormalities resulting from said stitching.

15. The method of claim 12, further comprising automatically picking said media sheet from an input tray and conveying said media sheet in said media feed direction to said first set of rollers.

16. The method of claim 15, wherein said media feed direction is along one of a substantially flat feed path, a C-shaped feed path and an L-shaped feed path.

17. The method of claim 12, wherein a scan direction is parallel to said media feed direction.

18. The method of claim 12, wherein a scan direction is transverse to said media feed direction.

19. The method of claim 12, wherein said media sheet includes an original image, said full image having a size that is substantially identical to a size of said original image.

20. A method for copying a media sheet with a scanning apparatus having a scanning area and a media transport system for conveying said media sheet in a media feed direction, said media transport system having a first set of rollers located upstream of said scanning area with respect to said media feed direction and a second set of rollers located downstream of said scanning area with respect to said media feed direction, said method comprising:

feeding said media sheet through said first set of rollers into said scanning area, such that a first end portion of said media sheet is available for scanning;

scanning a first partial media sheet image of said first portion of said media sheet, and storing said first partial media sheet image in memory;

feeding said media sheet such that an intermediate portion of said media sheet is available for scanning in said scanning area, wherein an extent of said intermediate portion of the media sheet partially overlaps an extent of the preceding portion of the media sheet;

scanning an intermediate partial media sheet image of said intermediate portion of said media sheet, and storing said intermediate partial media sheet image in memory;

feeding said media sheet into said second set of rollers, then out of said first set of rollers, such that a second end portion of said media sheet is available for scanning in said scanning area, wherein an extent of said second end portion of the media sheet partially overlaps an extent of the preceding intermediate portion of the media sheet;

scanning a second end partial media sheet image of said second end portion of said media sheet, and storing said second end partial media sheet image in memory;

stitching together at least said first end partial media sheet image, said intermediate partial media sheet image and said second end partial media sheet image to generate a full image of said media sheet; and reproducing said full image as a printed output.

21. A method for copying a plurality of media sheets with a scanning apparatus having a scanning area and a media transport system for conveying each of said media sheets in a media feed direction, said media transport system having a first set of rollers located upstream of said scanning area with respect to said media feed direction and a second set of rollers located downstream of said scanning area with respect to said media feed direction, said method comprising:

for each media sheet in the plurality of media sheets:
feeding said media sheet through said first set of rollers into said scanning area, such that a first portion of said media sheet is available for scanning:

scanning a first partial media sheet image of said first portion of said media sheet, and storing said first partial media sheet image in memory;

feeding said media sheet into said second set of rollers, then out of said first set of rollers, such that a second portion of said media sheet is available for scanning in said scanning area, wherein an extent of said second portion of the media sheet partially overlaps an extent of said first portion of the media sheet; and scanning a second partial media sheet image of said second portion of said media sheet, and storing said second partial media sheet image in memory;

stitching together the plurality of said first partial media sheet images and said second partial media sheet images to generate a panoramic image from said plurality of media sheets; and reproducing said panoramic image as a printed output.

22. The method of claim 21, wherein said first portion is greater than 50 percent of a length of said media sheet and said second portion is greater than 50 percent of said length of said media sheet.

23. The method of claim 21, further comprising correcting said panoramic image for image abnormalities resulting from said stitching and said scanning, said panoramic image having substantially identical scale size relative to a scale size of images on said plurality of media sheets copied.

* * * * *